United States Patent
Sun et al.

(10) Patent No.: US 9,309,396 B2
(45) Date of Patent: Apr. 12, 2016

(54) THERMOPLASTIC VULCANIZATE COMPOSITION, METHOD OF PRODUCING THE SAME, AND ARTICLES MADE THEREFROM

(75) Inventors: Yabin Sun, Shanghai (CN); Morgan M. Hughes, Angleton, TX (US); Xiangyang Tai, Shanghai (CN); Arnis U. Paeglis, Friendswood, TX (US); Gary R. Marchand, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/991,531

(22) PCT Filed: Dec. 30, 2010

(86) PCT No.: PCT/CN2010/080500
§ 371 (c)(1),
(2), (4) Date: Aug. 12, 2013

(87) PCT Pub. No.: WO2012/088689
PCT Pub. Date: Jul. 5, 2012

(65) Prior Publication Data
US 2013/0324658 A1    Dec. 5, 2013

(51) Int. Cl.
*C08L 23/16* (2006.01)
*C08L 23/26* (2006.01)
*C08K 5/00* (2006.01)

(52) U.S. Cl.
CPC ................. *C08L 23/26* (2013.01); *C08L 23/16* (2013.01); *C08K 5/0025* (2013.01); *C08L 2205/02* (2013.01); *C08L 2205/03* (2013.01); *C08L 2205/22* (2013.01); *C08L 2312/00* (2013.01)

(58) Field of Classification Search
CPC ....... C08L 23/16; C08L 23/26; C08L 23/142; C08L 23/12; C08L 2312/00; C08L 2205/03; C08L 2205/02; C08K 5/00025
USPC .......................................... 525/240; 524/525
See application file for complete search history.

(56) References Cited

U.S. PATENT DOCUMENTS

| 2,972,600 | A | 2/1961 | Braidwood |
| 3,093,613 | A | 6/1963 | Fusco et al. |
| 3,284,421 | A | 11/1966 | Breslow |
| 3,287,440 | A | 11/1966 | Giller |
| 3,297,674 | A | 1/1967 | Breslow et al. |
| 3,709,840 | A | 1/1973 | Dehoff |
| 4,111,897 | A | 9/1978 | Black |
| 4,130,535 | A | 12/1978 | Coran et al. |
| 4,311,628 | A | 1/1982 | Abdou-Sabet et al. |
| 4,594,390 | A | 6/1986 | Abdou-Sabet et al. |
| 4,645,793 | A | 2/1987 | Von Hellens et al. |
| 4,808,643 | A | 2/1989 | Lemoine et al. |
| 7,338,994 | B2 | 3/2008 | Walton et al. |
| 7,858,689 | B2 | 12/2010 | Abraham et al. |
| 2004/0010103 | A1 | 1/2004 | Boussie et al. |
| 2007/0282073 | A1 | 12/2007 | Weng et al. |
| 2008/0171821 | A1 | 7/2008 | Abraham et al. |
| 2010/0285253 | A1 | 11/2010 | Hughes et al. |

FOREIGN PATENT DOCUMENTS

| EP | 0404351 | 12/1990 |
| EP | 0969043 | 1/2000 |
| EP | 2049589 | 4/2009 |
| EP | 2029665 | 11/2010 |
| WO | WO02/059194 | 8/2002 |
| WO | WO2006/113132 | 10/2006 |

OTHER PUBLICATIONS

Japanese Response to Office Action dated Dec. 3, 2014; from Japanese counterpart Application No. 2013-546553.
PCT/CN2010/080500 International Search Report.
PCT/CN2010/080500 International Preliminary Report on Patentability dated Apr. 25, 2013.
EP Office Action dated Aug. 9, 2013; from EP counterpart Application No. 10861392.8.
Instructions to EP Office Action dated Jan. 29, 2014; from EP counterpart Application No. 10861392.8.
EP Extended Search Report dated Jul. 10, 2014; from EP counterpart Application No. 10861392.8.
JP Office Action dated Jun. 3, 2014; from JP counterpart Application No. 2013-546553.
Instructions to JP Office Action dated Aug. 4, 2014; from JP counterpart Application No. 2013-546553.

(Continued)

*Primary Examiner* — Nathan M Nutter

(57) ABSTRACT

A thermoplastic vulcanizate composition comprising from 5 wt % to 95 wt %, based on the total weight of the thermoplastic vulcanizate composition, of a first component comprising a first propylene-based polymer selected from the group consisting of (i) propylene/α-olefin copolymers comprising from 1 to 20 wt % α-olefin and characterized by a g' ratio of less than 1, measured at interpolymer number average molecular weight (Mn), an MFR (2.16 kg @ 230° C.) greater than or equal to 0.01, a density greater than or equal to 0.850 g/cc, and a molecular weight distribution, Mw/Mn, less than or equal to 3.5, and (ii) combinations thereof; and from 5 wt % to 95 wt %, based on the total weight of the thermoplastic vulcanizate composition, of a second component selected from the group consisting of curable or vulcanizable rubbers, having a density from 0.85 to 0.88 g/cc, $I_2$ from 0.001 to 5 g/10 min, and a Mooney viscosity from 5 to 400, and combinations thereof; wherein at least one of the rubbers is vulcanizable; wherein the thermoplastic vulcanizate composition has a tensile strength at break of greater than or equal to 8 MPa and tear strength at 23° C. of at least 190 lb-f/in. is provided. Methods of making the composition and articles made from the composition are also provided.

12 Claims, No Drawings

(56) References Cited

OTHER PUBLICATIONS

EP Office Action dated Jul. 14, 2014; from EP counterpart Application No. 10861392.8.
Response to Communication under Rule 70(2) and 70a(2) EPC dated Jul. 29, 2014 filed Feb. 3, 2015 for counterpart EP Application No. 10861392.8, 6 pages.
Chinese Office Action dated Dec. 31, 2014 for counterpart Chinese Application No. 201080071262.7, 5 pages.
Response to Chinese Office Action dated Dec. 31, 2014 filed Jun. 2, 2015 for counterpart Chinese Application No. 201080071262.7, 9 pages.
Chinese Office Action dated Aug. 23, 2015; from Chinese counterpart Application No. 201080071262.7.
Chinese Response tp Office Action dated Nov. 3, 2015; from Chinese counterpart Application No. 201080071262.7.

US 9,309,396 B2

THERMOPLASTIC VULCANIZATE COMPOSITION, METHOD OF PRODUCING THE SAME, AND ARTICLES MADE THEREFROM

FIELD OF INVENTION

The instant invention relates to a thermoplastic vulcanizate composition, method of producing the same, articles made therefrom, and methods for making such articles.

BACKGROUND OF THE INVENTION

There are two major types of commercial polymeric roofing membranes, namely those made from crosslinked ethylene/propylene/diene monomer (XL-EPDM) interpolymers and those made from thermoplastic polyolefin (TPO). TPO-based materials offer improved recyclability and sealability over commercial XL-EPDM materials. TPO-based materials, however, generally offer poor low temperature flexibility.

Thermoplastic Vulcanizate (TPV) materials, including XL-EPDM dispersed in a TPO polymeric matrix wherein the XL-EPDM has a particle size of several microns, have been developed for use in roofing membranes. In such materials, the TPO matrix may, in some instances, be a polypropylene (PP) in which the XL-EPDM interpolymer is miscible. Theoretically, TPV materials provide both the recyclability and sealability of TPO-based materials and the good low temperature flexibility of XL-EPDM materials.

Although numerous types of thermoplastic vulcanizates are known, there is still a need for further improvements on thermoplastic materials having good elastomeric properties. Specifically, there is a need for a method to produce thermoplastic vulcanizate with improved tensile strength, elongation, tear strength and processability.

SUMMARY OF THE INVENTION

The instant invention is a thermoplastic vulcanizate composition, method of producing the same, articles made therefrom, and methods for making such articles.

In one embodiment, the instant invention provides a thermoplastic vulcanizate composition comprising: from 5 wt % to 95 wt %, based on the total weight of the thermoplastic vulcanizate composition, of a first component comprising a first propylene-based polymer selected from the group consisting of (i) propylene/α-olefin copolymers comprising from 1 to 20 wt % α-olefin and characterized by a g' ratio of less than 1, measured at interpolymer number average molecular weight (Mn), an MFR (2.16 kg @ 230° C.) greater than or equal to 0.01, a density greater than or equal to 0.850 g/cc, and a molecular weight distribution, Mw/Mn, less than or equal to 3.5, and (ii) combinations thereof, and from 5 wt % to 95 wt %, based on the total weight of the thermoplastic vulcanizate composition, of a second component selected from the group consisting of curable or vulcanizable rubbers, having a density from 0.85 to 0.88 g/cc, $I_2$ from 0.001 to 5 g/10 min, and a Mooney viscosity from 5 to 400, and combinations thereof; wherein at least one of the rubbers is vulcanizable, wherein the thermoplastic vulcanizate composition has a tensile strength at break of greater than or equal to 8 MPa and tear strength at 23° C. of at least 190 lb-f/in.

In an alternative embodiment, the instant invention further provides a process for making a thermoplastic vulcanizate composition comprising: selecting a first component comprising a first propylene-based polymer selected from the group consisting of (i) propylene/α-olefin copolymers comprising from 1 to 20 wt % α-olefin and characterized by a g' ratio of less than 1, measured at interpolymer number average molecular weight (Mn), an MFR (2.16 kg @ 230° C.) greater than or equal to 0.01, a density greater than or equal to 0.850 g/cc, and a molecular weight distribution, Mw/Mn, less than or equal to 3.5, and (ii) combinations thereof; selecting a second component selected from the group consisting of curable or vulcanizable rubbers, having a density from 0.85 to 0.88 g/cc, $I_2$ from 0.001 to 5 g/10 min, and a Mooney viscosity from 5 to 400, and combinations thereof; wherein at least one of the rubbers is vulcanizable; and mixing the first and second components under dynamic vulcanization conditions to form the thermoplastic vulcanizate composition; wherein the thermoplastic vulcanizate composition has a tensile strength at break of greater than or equal to 8 MPa and tear strength at 23° C. of at least 190 lb-f/in.

In an alternative embodiment, the instant invention further provides an article comprised of one or more thermoplastic vulcanizate compositions of any one of the preceding embodiments.

In an alternative embodiment, the instant invention provides a composition, method of producing the same, and articles made therefrom, in accordance with any of the preceding embodiments, except that the second component comprises an ethylene-propylene-diene monomer interpolymer.

In an alternative embodiment, the instant invention provides a composition, method of producing the same, and articles made therefrom, in accordance with any of the preceding embodiments, except that the thermoplastic vulcanizate composition further comprises from greater than 0 wt % to 50 wt %, based on the total weight of the thermoplastic vulcanizate composition, of a third component comprising a second propylene-based polymer having a melting temperature greater than 120° C. and selected from the group consisting of (i) propylene homopolymers, (ii) propylene-α-olefin interpolymers comprising at least 80 wt % propylene, and (iii) combinations thereof.

In an alternative embodiment, the instant invention provides a composition, method of producing the same, and articles made therefrom, in accordance with any of the preceding embodiments, except that the thermoplastic vulcanizate composition further comprises from greater than 0 wt % to 2 wt %, based on the total weight of the thermoplastic vulcanizate composition, of a fourth component selected from the group consisting of phenolic resins, peroxides, maleimides, silicon-containing azides, and combinations thereof.

In an alternative embodiment, the instant invention provides a composition, method of producing the same, and articles made therefrom, in accordance with any of the preceding embodiments, except that the thermoplastic vulcanizate composition according further comprises one or more additives selected from the group consisting of, colored pigments, stabilizers, antidegradants, flame retardants, processing aids, adhesives, tackifiers, plasticizers, waxes, and discontinuous fibers.

In an alternative embodiment, the instant invention provides a composition, method of producing the same, and articles made therefrom, in accordance with any of the preceding embodiments, except that the thermoplastic vulcanizate composition further comprises one or more fillers.

In an alternative embodiment, the instant invention provides a composition, method of producing the same, and articles made therefrom, in accordance with any of the preceding embodiments, except that the process further comprises: selecting a third component comprising a second propylene-based polymer selected from the group consisting of (i) propylene homopolymers, (ii) propylene-α-olefin interpolymers comprising at least 80 wt % propylene, and (iii) combinations thereof; and mixing the third component with the first and second components under the dynamic vulcanization conditions.

In an alternative embodiment, the instant invention provides a composition, method of producing the same, and articles made therefrom, in accordance with any of the preceding embodiments, except that the process further comprises: selecting a fourth component selected from the group consisting of phenolic resins, peroxides, maleimides, silicon-containing azides, and combinations thereof; and mixing the fourth component with the first and second components under the dynamic vulcanization conditions.

In an alternative embodiment, the instant invention provides a composition, method of producing the same, and articles made therefrom, in accordance with any of the preceding embodiments, except that the first propylene-based polymer has a g' ratio of less than 0.85, measured at interpolymer number average molecular weight (Mn).

In an alternative embodiment, the instant invention provides a composition, method of producing the same, and articles made therefrom, in accordance with any of the preceding embodiments, except that the first propylene-based polymer has a g' ratio of less than 0.80, measured at interpolymer number average molecular weight (Mn).

In an alternative embodiment, the instant invention provides a composition, method of producing the same, and articles made therefrom, in accordance with any of the preceding embodiments, except that the first propylene-based polymer comprises at least 80 weight percent (wt %) units derived from propylene, and between 1 and 20 wt % units derived from ethylene.

In an alternative embodiment, the instant invention provides a composition, method of producing the same, and articles made therefrom, in accordance with any of the preceding embodiments, except that the first propylene-based polymer is characterized by a relative compositional drift of less than 50%.

In an alternative embodiment, the instant invention provides a composition, method of producing the same, and articles made therefrom, in accordance with any of the preceding embodiments, except that the first propylene-based polymer is characterized by a relative compositional drift of less than 40%.

In an alternative embodiment, the instant invention provides a composition, method of producing the same, and articles made therefrom, in accordance with any of the preceding embodiments, except that the first propylene-based polymer is characterized by a propylene chain segments having a chain isotacticity triad index of at least 70 mole percent.

In an alternative embodiment, the instant invention provides a composition, method of producing the same, and articles made therefrom, in accordance with any of the preceding embodiments, except that the first propylene-based polymer is characterized by a propylene chain segments having a chain isotacticity triad index of at least 80 mole percent.

In an alternative embodiment, the instant invention provides a thermoplastic vulcanizate composition, method of producing the same, articles made therefrom, and method of making such articles, in accordance with any of the preceding embodiments, except that the thermoplastic vulcanizate composition further comprises one or more oils.

In an alternative embodiment, the instant invention provides a thermoplastic vulcanizate composition, method of producing the same, articles made therefrom, and method of making such articles, in accordance with any of the preceding embodiments, except that the articles are weatherstripping, flexible rubber goods, such as constant velocity joint sleeves, foams, such as shoe foams and under dash interior car applications, and wire and cable jacketing.

In one embodiment, the instant invention provides a thermoplastic vulcanizate composition consisting essentially of: from 5 wt % to 95 wt %, based on the total weight of the thermoplastic vulcanizate composition, of a first component comprising a first propylene-based polymer selected from the group consisting of (i) propylene/α-olefin copolymers comprising from 1 to 20 wt % α-olefin and characterized by a g' ratio of less than 1, measured at interpolymer number average molecular weight (Mn), an MFR (2.16 kg @ 230° C.) greater than or equal to 0.01, a density greater than or equal to 0.850 g/cc, and a molecular weight distribution, Mw/Mn, less than or equal to 3.5, and (ii) combinations thereof, and from 5 wt % to 95 wt %, based on the total weight of the thermoplastic vulcanizate composition, of a second component selected from the group consisting of curable or vulcanizable rubbers, having a density from 0.85 to 0.88 g/cc, $I_2$ from 0.001 to 5 g/10 min, and a Mooney viscosity from 5 to 400, and combinations thereof; wherein at least one of the rubbers is vulcanizable, wherein the thermoplastic vulcanizate composition has a tensile strength at break of greater than or equal to 8 MPa and tear strength at 23° C. of at least 190 lb-f/in.

DETAILED DESCRIPTION OF THE INVENTION

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The instant invention is a thermoplastic vulcanizate composition, process of producing the same, and articles made therefrom.

The thermoplastic vulcanizate composition according to the present invention comprises: from 5 wt % to 95 wt %, based on the total weight of the thermoplastic vulcanizate composition, of a first component comprising a first propylene-based polymer selected from the group consisting of (i) propylene/α-olefin copolymers comprising from 1 to 20 wt % α-olefin and having a g' ratio of less than 1, measured at interpolymer number average molecular weight (Mn), an MFR (2.16 kg @ 230° C.) greater than or equal to 0.01 g/10 min, a density greater than or equal to 0.850 g/cc, and molecular weight distribution, Mw/Mn, less than 4, and (ii) combinations thereof, and from 5 wt % to 95 wt %, based on the total weight of the thermoplastic vulcanizate composition, of a second component selected from the group consisting of curable or vulcanizable rubbers, having a density from 0.85 to 0.88 g/cc, MFR (2.16 kg @ 230° C.) from 0.0001 to 5 g/10 min, and a Mooney viscosity (1+4 @ 125° C.) from 5 to 400, and combinations thereof wherein at least one of the rubbers is vulcanizable; wherein the thermoplastic vulcanizate composition has a tensile strength at break of greater than or equal to 8 MPa and tear strength at 23° C. of at least 190 lb-f/in.

The thermoplastic vulcanizate composition according to the present invention comprises: from 5 wt % to 95 wt %, based on the total weight of the thermoplastic vulcanizate composition, of a first component selected from the group consisting of (i) propylene/α-olefin copolymer having a MFR (2.16 kg @ 230° C.) greater than or equal to 0.01 g/10 min, a density greater than or equal to 0.850 g/cc, molecular weight distribution, Mw/Mn, less than 4, a narrow co-monomer distribution; and comprising from 1 to 20 wt % α-olefin, based on the total weight of the propylene/α-olefin copolymer, and (ii) combinations thereof. All individual values and subranges from 5 to 95 weight percent of the first component are included herein and disclosed herein; for example, the weight percent of the first component can be from a lower limit of 5, 10, 20, 40, 60, 80 or 90 weight percent to an upper limit of 10, 30, 50, 70, 90 or 95 weight percent. For example, the amount of the first component in the thermoplastic vulcanizate composition may be in the range of from 5 to 95 weight percent, or in the alternative, the amount of the first component in the thermoplastic vulcanizate composition may be in the range of from 5 to 75 weight percent, or in the alternative, the amount of the first component in the thermoplastic vulcanizate composition may be in the range of from 5 to 50 weight percent, or in the alternative, the amount of the first component in the thermoplastic vulcanizate composition may be in the range of from 10 to 50 weight percent, or in the alternative, the amount of the first component in the thermoplastic vulcanizate composition may be in the range of from 10 to 40 weight percent, or in the alternative, the amount of the first component in the thermoplastic vulcanizate composition may be in the range of from 15 to 60 weight percent.

The First Component: First Propylene-Based Polymer

Propylene/α-olefin copolymers useful as the first propylene-based polymer has a g' ratio of less than 1, measured at interpolymer number average molecular weight (Mn). The g' ratio is the ratio of the intrinsic viscosity (IV) value for the branched propylene-ethylene copolymer divided by the intrinsic viscosity value for the linear propylene-ethylene copolymer having similar ethylene content, i.e., polymer density, and similar molecular weight, i.e., melt flow rate. "Similar" means within twenty percent (20%) of each value. These g' ratios are calculated at the number average molecular weight (Mn) and weight average molecular weight values (Mw), according to equation (1):

$$g' = (IV_{branched}/IV_{linear}). \quad (1)$$

All individual values and sub-ranges from less than 1 are included herein and disclosed herein; for example, the g' ratio of the first propylene-based polymer can be from an upper limit of 0.99, 0.95, 0.90, 0.85 or 0.8.

In some embodiments of the inventive composition, the first propylene-based polymer comprises an average of at least 0.001 long chain branches per 1000 total carbons. All individual values and sub-ranges from at least 0.001 long chain branches per 1000 total carbons are included herein and disclosed herein; for example, the level of long chain branching in the first propylene-based polymer can be from a lower limit of 0.001 long chain branches per 1000 total carbons, 0.005 long chain branches per 1000 total carbons, 0.01 long chain branches per 1000 total carbons, or 0.05 long chain branches per 1000 total carbons.

In an alternative embodiment, the first propylene-based polymer comprises an average of no more than 3 long chain branches per 1000 total carbons. All individual values and sub-ranges up to no more than 3 long chain branches per 1000 total carbons are included herein and disclosed herein; for example, the level of long chain branching in the p first propylene-based polymer can be from an upper limit of 3 long chain branches per 1000 total carbons, 2 long chain branches per 1000 total carbons, 1 long chain branch per 1000 total carbons, 0.1 long chain branches per 1000 total carbons, 0.01 long chain branches per 1000 total carbons, or 0.001 long chain branches per 1000 total carbons.

Long chain branching (LCB) means a chain length greater than that resulting from the incorporation of the comonomer into the polymer backbone. For example, a propylene/1-octene interpolymer of this invention has backbones with long chain branches of at least seven (7) carbons n length, but these backbones also have short chain branches of only six (6) carbons in length. In contrast, a propylene/1-hexene interpolymer of this invention will have long chain branches of at least five (5) carbons in length but shore chain branches of only four (4) carbons in length.

The first propylene-based polymers may, in some embodiments, have a weight average molecular weight, Mw, from 10,000 to 5,000,000 g/mole. All individual values and sub-ranges from 10,000 to 5,000,000 g/mole are included herein and disclosed herein; for example, the Mw of the first propylene-based polymer can be from a lower limit of 10,000; 40,000; 80,000; 200,000; 300,000; or 4,000,000 g/mole to an upper limit of 40,000; 80,000; 200,000; 300,000; or 5,000,000 g/mole. For example, the Mw of the first propylene-based polymer may be in the range of from 10,000 to 5,000,000 g/mole, or in the alternative, the Mw of the first propylene-based polymer may be in the range of from 40,000 to 300,000 g/mole, or in the alternative, the Mw of the first propylene-based polymer may be in the range of from 80,000 to 200,000 g/mole.

The first propylene-based polymers have an MFR (2.16 kg @ 230° C.) greater than or equal to 0.01 g/10 min. All individual values and sub-ranges from greater than or equal to 0.01 g/10 min are included herein and disclosed herein; for example, the MFR of the first propylene-based polymer can be from a lower limit of 0.01, 0.05, 0.1, 0.5, 1, 10, or 50 g/10 min, to an upper limit of 0.05, 0.1, 1, 10, 50, 80, or 100 g/10 min. For example, the MFR of the first propylene-based polymer may be in the range of from 0.01 to 100 g/10 min, or in the alternative, the MFR of the first propylene-based polymer may be in the range of from 0.05 to 80 g/10 min, or in the alternative, the MFR of the first propylene-based polymer may be in the range of from 0.1 to 50 g/10 min or in the alternative, the MFR of the first propylene-based polymer may be in the range of from 0.5 to 50 g/10 min.

The first propylene-based polymers have a density greater than or equal to 0.850 g/cc. All individual values and sub-ranges from greater than or equal to 0.850 g/cc. are included herein and disclosed herein; for example, the density of the first propylene-based polymer can be from a lower limit of 0.850 g/cc, 0.86 g/cc, 0.865 g/cc, 0.89 g/cc, 0.9 g/cc, or 0.91 g/cc to an upper limit of 0.86 g/cc, 0.865 g/cc, 0.89 g/cc, 0.9 g/cc, 0.91 g/cc, or 0.915 g/cc. For example, the density of the first propylene-based polymer may be in the range from 0.85 to 0.90 g/cc, or in the alternative, the density of the first propylene-based polymer may be in the range from 0.86 to 0.89 g/cc, density of the first propylene-based polymer may be in the range from 0.865 to 0.90 g/cc.

The first propylene-based polymer has a molecular weight distribution, Mw/Mn, (MWD) (abs), less than 4. All individual values and sub-ranges from less than 4 are included herein and disclosed herein; for example, the Mw/Mn of the propylene/α-olefin copolymers can be from a lower limit of 1.5, 2, 2.5, 3 or 3.5 to an upper limit of 2, 2.5, 3, 3.5 or 4. For example, the MWD of the first component may be in the range of from 1.5 to 4, or in the alternative, the MWD of the first component may be in the range of from 2 to 3, or in the alternative, the MWD of the first component may be in the range of from 2.5 to 3.5, or in the alternative, the MWD of the first component may be in the range of from 3 to 4.

In some embodiments of the inventive composition, the first propylene-based polymer is characterized by propylene chain segments having a chain isotacticity triad index of at least 70 mole percent. All individual values and subranges from at least 70 mole percent are included herein and disclosed herein. For example, the first propylene-based polymer are characterized by propylene chain segments having a chain isotacticity triad index of at least 80 mole percent, or in the alternative, the first propylene-based polymer are characterized by propylene chain segments having a chain isotacticity triad index of at least 90 mole percent, or in the alternative, the first propylene-based polymer are characterized by propylene chain segments having a chain isotacticity triad index of at least 95 mole percent.

Propylene/α-olefin copolymers useful as the first propylene-based polymer have a narrow co-monomer distribution and comprise from 1 to 20 wt % α-olefin, based on the total weight of the propylene/α-olefin copolymer. All individual values and sub-ranges from 1 to 20 wt % are included herein and disclosed herein; for example, the first propylene-based polymer can have a weight percent of units derived from α-olefin from a lower limit of 1, 5, 10, or 15 weight percent to an upper limit of 5, 10, 15 or 20 weight percent. For example, the weight percent of the first propylene-based polymer derived from α-olefin may be in the range of from 1 to 20 weight percent, or in the alternative, the weight percent of the first propylene-based polymer derived from α-olefin may be in the range of from 10 to 20 weight percent, or in the alternative, the weight percent of the first propylene-based polymer derived from α-olefin may be in the range of from 15 to 20 weight percent, or in the alternative, the weight percent of the first propylene-based polymer derived from α-olefin may be in the range of from 5 to 15 weight percent.

In some embodiments of the inventive composition, the first propylene-based polymer has a narrow co-monomer distribution. In some embodiments of the invention, the first propylene-based polymer have a compositional drift of less than, or equal to, 50%. All individual values and subranges of less than, or equal to, 50% are included herein and disclosed herein. For example, the first propylene-based polymer copolymers may have a compositional drift of less than, or equal to, 50%, or in the alternative, the first propylene-based polymer may have a compositional drift of less than, or equal to, 40%.

Exemplary propylene/α-olefin copolymers useful as the first propylene-based polymer include those described in U.S. Published Application No. 20100285253, the disclosure of which is incorporated herein by reference.

Propylene/α-olefin copolymers useful as the first propylene-based polymer may be made according to the methods and utilizing the catalyst systems described in U.S. Published Application No. 20100285253, previously incorporated herein by reference.

In one embodiment, the first propylene-based polymer is prepared by polymerizing propylene and ethylene using a hafnium metal complex and from 10 to 200 moles per mole of hafnium of an aluminoxane, under continuous, solution polymerization conditions at a temperature from 120 to 250° C., alternatively from 130 to 250° C., under high propylene conversion conditions (>75% or in the alternative >80%) to prepare a polymer comprising, in polymerized form, from 1 to 20 weight percent units derived from ethylene.

For example, the first propylene-based polymer may be prepared using a Group 4 metal complex of a bis(hydroxyarylaryloxy) ligand. One specific metal complex which may be used in preparing propylene-α-olefin copolymer useful in the invention is [[rel-2',2'''-[(1R,2R)-1,2-cyclohexanediylbis(methyleneoxy-κO)]bis[3-(9H-carbazol-9-yl)-5-methyl[1,1'-biphenyl]-2-olato-κO]](2-)]dimethyl hafnium and is depicted by the following structure, wherein the R groups are methyl groups:

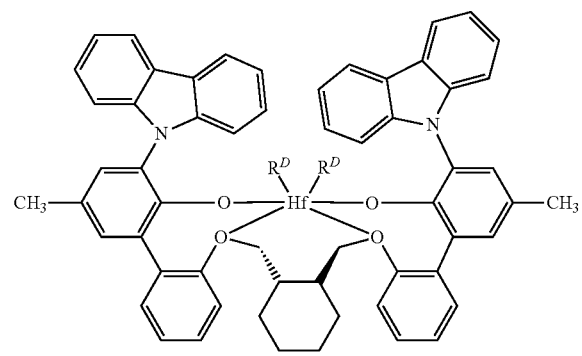

In alternative embodiments, the first propylene-based polymer may be produced using a metal complex depicted by the foregoing structure wherein $R^D$ independently each occurrence is chloro, methyl, or benzyl.

The metal complexes useful as catalysts in preparing the first propylene-based polymer useful in the inventive compositions may be prepared by standard metallation and ligand exchange procedures involving a source of the transition metal and a neutral polyfunctional ligand source. The techniques employed may be the same as or analogous to those disclosed in, for example, U.S. Pat. No. 6,827,976 and U.S. Patent Publication No. 20040010103, the disclosures of which are incorporated herein by reference.

Exemplary first propylene-based polymer useful in the inventive compositions include VERSIFY 3000 and VERSIFY 3200, available from The Dow Chemical Company.

The first propylene-based polymer useful in the inventive thermoplastic vulcanizate compositions may comprise a combination of two or more embodiments as described herein.

The Second Component: Curable or Vulcanizable Rubbers

The thermoplastic vulcanizate composition according to the present invention comprises from 5 wt % to 95 wt %, based on the total weight of the thermoplastic vulcanizate composition, of a second component selected from the group consisting of curable or vulcanizable rubbers, having a density from 0.85 to 0.88 g/cc, $I_2$ from 0.0001 to 5 g/10 min, and a Mooney viscosity from 5 to 400, and combinations thereof. All individual values and subranges from 5 to 95 weight percent of the second component are included herein and disclosed herein; for example, the weight percent of the second component can be from a lower limit of 5, 10, 20, 40, 60, 80 or 90 weight percent to an upper limit of 10, 30, 50, 70, 90 or 95 weight percent. For example, the amount of the second component in the thermoplastic vulcanizate composition may be in the range of from 5 to 95 weight percent, or in the alternative, the amount of the second component in the thermoplastic vulcanizate composition may be in the range of from 25 to 95 weight percent, or in the alternative, the amount of the second component in the thermoplastic vulcanizate composition may be in the range of from 50 to 95 weight percent, or in the alternative, the amount of the second component in the thermoplastic vulcanizate composition may be in the range of from 50 to 90 weight percent, or in the alternative, the amount of the second component in the thermoplastic vulcanizate composition may be in the range of from 60 to 90 weight percent, or in the alternative, the amount of the second component in the thermoplastic vulcanizate composition may be in the range of from 40 to 85 weight percent.

The second component, useful in the inventive compositions, is selected from the group consisting of curable or vulcanizable rubber, and has a density from 0.85 to 0.88 g/cc. All individual values and subranges from 0.85 to 0.88 g/cc are included herein and disclosed herein; for example, the density of the second component can be from a lower limit of 0.85, 0.86, or 0.87 g/cc to an upper limit of 0.86, 0.87, or 0.88 g/cc. For example, the density of the second component in the thermoplastic vulcanizate composition may be in the range of from 0.85 to 0.88 g/cc, or in the alternative, the density of the second component in the thermoplastic vulcanizate composition may be in the range of from 0.86 to 0.88 g/cc, or in the alternative, the density of the second component in the thermoplastic vulcanizate composition may be in the range of from 0.87 to 0.88 g/cc.

The curable or vulcanizable rubbers useful in the second component in the inventive composition include both synthetic and natural rubbers and combinations thereof provided at least one of the rubbers is curable (i.e., crosslinkable) or vulcanizable. Illustrative, non-limiting examples of rubbers include butyl rubber, halogenated butyl rubber, ethylene-propylene-diene rubber (EPDM), polyisoprene, polychloroprene, styrene-butadiene rubber, nitrile rubbers, and chlorosulfonated polyethylene.

The second component is selected from the group consisting of curable or vulcanizable rubbers having an $I_2$ from 0.001 to 5 g/10 min. All individual values and sub-ranges from 0.001 to 5 g/10 min are included herein and disclosed herein; for example, the $I_2$ of the second component can be from a lower limit of 0.001, 0.01, 0.1, 0.1, or 1 g/10 min to an upper limit of 0.01, 0.1, 1, or 5 g/10 min. For example, the $I_2$ of the second component in the thermoplastic vulcanizate composition may be in the range of from 0.001 to 5 g/10 min, or in the alternative, the $I_2$ of the second component in the thermoplastic vulcanizate composition may be in the range of from 0.001 to 0.01 g/10 min, or in the alternative, the $I_2$ of the second component in the thermoplastic vulcanizate composition may be in the range of from 0.1 to 1 g/10 min.

The second component, useful in the inventive compositions, is selected from the group consisting of curable or vulcanizable rubber, has a Mooney viscosity [1+4 @ 125° C.] from 5 to 400. All individual values and sub-ranges from 5 to 400 are included herein and disclosed herein; for example, the Mooney viscosity [1+4 @ 125° C.] of the second component can be from a lower limit 5, 50, 100, 150, 200, 250, 300, or 350 to an upper limit of 50, 100, 150, 200, 250, 300, 350, or 400. For example, the Mooney viscosity [1+4 @ 125° C.] of the second component in the thermoplastic vulcanizate composition may be in the range of from 5 to 400, or in the alternative, the Mooney viscosity [1+4 @ 125° C.] of the second component in the thermoplastic vulcanizate composition may be in the range of from 100 to 200, or in the alternative, the Mooney viscosity [1+4 @ 125° C.] of the second component in the thermoplastic vulcanizate composition may be in the range of from 200 to 400.

Curable or vulcanizable rubbers useful in the inventive compositions may include any vulcanizable elastomer or rubber which is derived from at least an olefin, provided that the vulcanizable elastomer can be cross-linked (i.e., vulcanized) by a cross-linking agent. The vulcanizable elastomer and the first component together can form a thermoplastic vulcanizate (TPV) after cross-linking Vulcanizable elastomers, although generally thermoplastic in the uncured state, are normally classified as thermosets because they undergo an irreversible process of thermosetting to an unprocessable state. Preferably, the vulcanized elastomer is dispersed in a matrix of the thermoplastic polymer as domains. The average domain size may range from about 0.1 micron to about 100 micron, from about 1 micron to about 50 microns; from about 1 micron to about 25 microns; from about 1 micron to about 10 microns, or from about 1 micron to about 5 microns.

Non-limiting examples of suitable vulcanizable elastomers or rubbers include ethylene/higher α-olefin/polyene terpolymer rubbers such as EPDM. Any such terpolymer rubber which can be completely cured (cross-linked) with a phenolic curative or other cross-linking agent is satisfactory. In some embodiments, the terpolymer rubbers can be essentially non-crystalline, rubbery terpolymer of two or more alpha-olefins, preferably copolymerized with at least one polyene (i.e, an alkene comprises two or more carbon-carbon double bonds), usually a non-conjugated diene. Suitable terpolymer rubbers comprise the products from the polymerization of monomers comprising two olefins having only one double bond, generally ethylene and propylene, and a lesser quantity of non-conjugated diene. The amount of non-conjugated diene is usually from about 2 to about 10 weight percent of the rubber. Any terpolymer rubber which has sufficient reactivity with phenolic curative to completely cure is suitable. The reactivity of terpolymer rubber varies depending upon both the amount of unsaturation and the type of unsaturation present in the polymer. For example, terpolymer rubbers derived from ethylidene norbornene are more reactive toward phenolic curatives than terpolymer rubbers derived from dicyclopentadiene and terpolymer rubbers derived from 1,4-hexadiene are less reactive toward phenolic curatives than terpolymer rubbers derived from dicyclopentadiene. However, the differences in reactivity can be overcome by polymerizing larger quantities of less active diene into the rubber molecule. For example, 2.5 weight percent of ethylidene norbornene or dicyclopentadiene may be sufficient to impart sufficient reactivity to the terpolymer to make it completely curable with phenolic curative comprising conventional cure activators, whereas, at least 3.0 weight percent or more is required to obtain sufficient reactivity in an terpolymer rubber derived from 1,4-hexadiene. Grades of terpolymer rubbers such as EPDM rubbers suitable for embodiments of the invention are commercially available. Some of the EPDM rubbers are disclosed in Rubber World Blue Book 1975 Edition, Materials and Compounding Ingredients for Rubber, pages 406-410.

Generally, a terpolymer elastomer has an ethylene content of from about 10% to about 90% by weight, a higher alpha-olefin content of about 10% to about 80% by weight, and a polyene content of about 0.5% to about 20% by weight, all weights based on the total weight of the polymer. The higher α-olefin contains from about 3 to about 14 carbon atoms. Examples of these are propylene, isobutylene, 1-butene, 1-pentene, 1-octene, 2-ethyl-1-hexene, 1-dodecene, and the like. The polyene can be a conjugated diene such as isoprene, butadiene, chloroprene, and the like; a nonconjugated diene; a triene, or a higher enumerated polyene. Examples of trienes are 1,4,9-decatriene, 5,8-dimethyl-1,4,9-decatriene, 4,9-dimethyl-1,4,9-decatriene, and the like. The nonconjugated dienes are more preferred. The nonconjugated dienes contain from 5 to about 25 carbon atoms. Examples are nonconjugated diolefins such as 1,4-pentadiene, 1,4-hexadiene, 1,5- hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclo nondienes such as 3-methyl-bicyclo(4,2,1)nona-3,7-diene, 3-ethylbicyclonondiene, and the like; indenes such as methyl tetrahydroindene and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadieneyl)-2-norbornene, and the like; and tricyclo dienes such as 3-methyl-tricyclo-(5,2,1,0$^{2,6}$)-3,8-decadiene and the like.

In some embodiments, the terpolymer rubbers contain from about 20% to about 80% by weight of ethylene, about 19% to about 70% by weight of a higher α-olefin, and about 1% to about 10% by weight of a nonconjugated diene. The more preferred higher α-olefins are propylene and 1-butene. The more preferred polyenes are ethylidene norbornene, 1,4-hexadiene, and dicyclopentadiene.

In other embodiments, the terpolymer rubbers have an ethylene content of from about 50% to about 70% by weight, a propylene content of from about 20% to about 49% by weight, and a nonconjugated diene content from about 1% to about 10% by weight, all weights based upon the total weight of the polymer.

Some non-limiting examples of terpolymer rubbers for use include NORDEL® IP 4770R, NORDEL® 3722 IP available from DuPont Dow Elastomers, Wilmington, Del. and KELTAN® 5636A available from DSM Elastomers Americas, Addis, La.

Additional suitable elastomers are disclosed in the following U.S. Pat. Nos. 4,130,535; 4,111,897; 4,311,628; 4,594,390; 4,645,793; 4,808,643; 4,894,408; 5,936,038, 5,985,970; and 6,277,916, each of which are incorporated by reference herein in their entirety.

The Optional Third Component: Second Propylene-Based Polymer

In some embodiments of the invention, the inventive thermoplastic vulcanizate composition further comprises a third component comprising a second propylene-based polymer characterized by a melting temperature of greater than 120° C. and selected from the group consisting of (i) propylene homopolymers, (ii) propylene/α-olefin copolymers comprising at least 80 wt % propylene and (iii) combinations thereof.

The third component, which may be included in some embodiments of the inventive composition, may be selected from the group consisting of homo-, impact, and random polymers of propylene, and combinations thereof.

The second propylene-based polymers useful in some embodiments of the inventive composition have a melting point greater than 120° C. All individual values and subranges from greater than 120° C. are included herein and disclosed herein; for example, the melting point of the second propylene-based polymer can be from a lower limit of greater than 120° C., or in the alternative, the melting point of the second propylene-based polymer can be greater than, or equal to 125° C., or in the alternative, the melting point of the second propylene-based polymer can be greater than, or equal to 130° C., or in the alternative, the melting point of the second propylene-based polymer can be greater than, or equal to 135° C.

In one embodiment, the optional second propylene-based polymer is a polypropylene homopolymer.

In one embodiment, the polypropylene homopolymer has a melting point (Tm), as determined by DSC, greater than, or equal to, 125° C., or greater than, or equal to, 130° C., greater than, or equal to, 135° C., greater than, or equal to, 140° C.

In one embodiment, the polypropylene homopolymer has a heat of fusion ($\Delta H_f$), as determined by DSC, greater than, or equal to, 100 J/g, or greater than, or equal to, 80 J/g, greater than, or equal to, 85 J/g.

In one embodiment, the polypropylene homopolymer has a weight average molecular weight ($M_w$) within the range having an upper limit of 5,000,000 g/mol, or 500,000 g/mol, and a lower limit of 10,000 g/mol, or 50,000 g/mol.

In one embodiment, the polypropylene homopolymer has a molecular weight distribution $M_w/M_n$ (MWD), sometimes referred to as a "polydispersity index" (PDI), within the range having an upper limit of 40, or 30, or 20, or 10, and a lower limit of 2, or 3, or 4, or 5.

The third component in a preferred embodiment of the composition includes greater than or equal to 90 weight percent units derived from propylene with a remainder derived from olefins, particularly ethylene, and/or $C_4$-$C_{10}$ α-olefins.

Certain embodiments of the inventive composition comprise a third component which comprises a second propylene-based polymer having a high MFR, namely from greater than 10 g/10 min to 40 g/10 min. All individual values and subranges from greater than 10 to 40 g/10 min are included herein and disclosed herein; for example, the MFR of the second propylene-based polymer can be from a lower limit of 10, 20, 30 or 35 g/10 min to an upper limit of 15, 20, 25, 30, 35, or 40 g/10 min. For example, the MFR of the second propylene-based polymer may be in the range of from 10 to 40 g/10 min, or in the alternative, the MFR of the second propylene-based polymer may be in the range of from 20 to 30 g/10 min, or in the alternative, the MFR of the second propylene-based polymer may be in the range of from 15 to 35 g/10 min.

The optional second propylene-based polymer may be present in an amount from 0 to 50 weight percent, based on the total weight of the thermoplastic vulcanizate composition. All individual values and subranges from 0 to 50 weight percent are included herein and disclosed herein; for example, the amount of the third component can be from a lower limit of 0, 10, 20, 30, or 40 weight percent to an upper limit of 10, 20, 30, 40, or 50 weight percent. For example, the amount of the third component may be in the range of from 0 to 50 weight percent, or in the alternative, the amount of the third component may be in the range of from 10 to 50 weight percent, the amount of the third component may be in the range of from 20 to 40 weight percent, the amount of the third component may be in the range of from 15 to 45 weight percent, the amount of the third component may be in the range of from 10 to 20 weight percent.

In some embodiments of the inventive composition, the second propylene-based polymer is a propylene/α-olefin copolymer.

In those embodiments in which the third component comprises a propylene/α-olefin copolymer, the propylene/α-olefin copolymer comprises greater than or equal to 80 wt % units derived from propylene, based on the total weight of the propylene-/α-olefin copolymer. All individual values and subranges greater than or equal to 80 wt % units derived from propylene are included herein and disclosed herein; for example, the propylene/α-olefin copolymer may comprise amount of units derived from propylene from a lower limit of 80, 82, 84, 86, 88, 90, 92, 94, 96, 98 or 100 weight percent, based on the total weight of the propylene-α-olefin copolymer.

In one embodiment, the third component is a propylene/ethylene copolymer.

In one embodiment, the propylene/ethylene copolymer comprises greater than, or equal to, 80 wt %, or greater than, or equal to, 85 wt %, or greater than, or equal to, 90 wt %, or greater than, or equal to, 95 wt %, or greater than, or equal to, 98 wt % of polymerized propylene, based on the weight of the copolymer.

In one embodiment, the propylene/ethylene copolymer comprises less than, or equal to, 10 wt %, or less than, or equal to, 8 wt %, or less than, or equal to, 6 wt %, or less than, or equal to, 4 wt %, or less than, or equal to, 2 wt % of polymerized ethylene, based on the weight of the copolymer.

In one embodiment, the propylene/ethylene copolymer has a melting point (Tm), as determined by DSC, greater than, or equal to, 120° C., or greater than, or equal to, 125° C., greater than, or equal to, 130° C., greater than, or equal to, 140° C.

In one embodiment, the propylene/ethylene copolymer has a heat of fusion ($\Delta H_f$), as determined by DSC, greater than, or equal to, 75 J/g, or greater than, or equal to, 80 J/g, greater than, or equal to, 85 J/g.

In one embodiment, the propylene/ethylene copolymer has a weight average molecular weight ($M_w$) within the range having an upper limit of 5,000,000 g/mol, or 500,000 g/mol, and a lower limit of 10,000 g/mol, or 50,000 g/mol.

The second propylene-based polymers include, for example, those described in detail in the U.S. Pat. Nos. 6,960,635 and 6,525,157, incorporated herein by reference. Such propylene/$\alpha$-olefin copolymers are commercially available from The Dow Chemical Company, under the tradename VERSIFY Elastomers and Plastomers or from ExxonMobil Chemical Company, under the tradename VISTAMAXX.

Other exemplary second propylene-based polymers include random copolymer polypropylenes such as MOPLEN RP220 available from LyondellBasell and R352-08R available from The Dow Chemical.

The propylene homopolymer may be formed by the homopolymerization of propylene in a single stage or multiple stage reactors.

The propylene/ethylene copolymer may be formed by copolymerizing propylene and ethylene in a single stage or multiple stage reactors.

Polymerization methods for preparing the polypropylene homopolymer or propylene/ethylene copolymer include high pressure, slurry, gas, bulk, solution phase, and combinations thereof. Catalyst systems include traditional Ziegler-Natta catalysts and single-site, metallocene catalyst systems. In one embodiment, the catalyst used has a high isospecificity. Each polymerization may be carried out by a continuous or batch process, and may include the use of chain transfer agents, scavengers, or other such additives well-known to those skilled in the art. The polypropylene homopolymer or propylene/ethylene copolymer may also contain one or more additives, such as flow improvers, nucleators, and antioxidants.

A third component useful in the inventive composition may comprise a combination of two or more embodiments as described herein.

The Optional Fourth Component

In some embodiments of the invention, the inventive thermoplastic vulcanizate composition further comprises from greater than 0 wt % to 2 wt %, based on the total weight of the thermoplastic vulcanizate composition, of a fourth component selected from the group consisting of curing agents and vulcanizing agents. All individual values and subranges from 0 to 2 weight percent are included herein and disclosed herein; for example, the amount of the optional fourth component in the inventive thermoplastic vulcanizates can be from a lower limit of 0, 0.1, 0.5, 1.0, or 1.5 weight percent to an upper limit of 0.1, 0.5, 1.0, 1.5, or 2.0 weight percent. For example, the amount of the fourth component in the inventive thermoplastic vulcanizates may be in the range of from 0 to 2 weight percent, or in the alternative, the amount of the optional fourth component in the inventive thermoplastic vulcanizates may be in the range of from 0.1 to 1.5 weight percent, or in the alternative, the amount of the optional fourth component in the inventive thermoplastic vulcanizates may be in the range of from 0.5 to 1.0 weight percent, or in the alternative, the amount of the optional fourth component in the inventive thermoplastic vulcanizates may be in the range of from 0.1 to 1.0 weight percent.

Illustrative curing agents include, but are not limited to, phenolic resins, peroxides, maleimides, and silicon-containing azides curatives. Depending on the rubber employed, certain curatives can be preferred. For example, where elastomeric copolymers containing units deriving from vinyl norbornene are employed, a peroxide curative can be preferred because the required quantity of peroxide will not have a deleterious impact on the engineering properties of the thermoplastic phase of the thermoplastic vulcanizate. In other situations, however, it can be preferred not to employ peroxide curatives because they can degrade the thermoplastic components of the thermoplastic vulcanizate.

A preferred curing or vulcanizing agent is phenolic resin. Other curing agents include, but are not limited to, peroxides, azides, aldehyde-amine reaction products, vinyl silane grafted moieties, hydrosilylation, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. See Encyclopedia of Chemical Technology, Vol. 17, 2nd edition, Interscience Publishers, 1968; also Organic Peroxides, Daniel Seem, Vol. 1, Wiley-Interscience, 1970), which are incorporated by reference herein in their entirety. Unless stated otherwise, the curing or vulcanizing agents described below require an elastomer containing a conjugated or non-conjugated diene.

Phenolic curing agents comprising methylol phenolic resins, halogen donor and metal compound are especially recommended, details of which are described in U.S. Pat. Nos. 3,287,440 and 3,709,840, the disclosures of which are incorporated by reference herein in their entirety. Another suitable class of phenolic curing agents is disclosed in U.S. Pat. No. 5,952,425, which is incorporated by reference herein in its entirety. Non-halogenated phenol curing resins are used in conjunction with halogen donors, preferably, along with a hydrogen halide scavenger. Ordinarily, halogenated, preferably brominated, phenolic resins containing from about 2 to about 10 weight percent bromine, do not require a halogen donor but are used in conjunction with a hydrogen halide scavenger such as metal oxides such as iron oxide, titanium oxide, magnesium oxide, magnesium silicate, silicon dioxide and preferably zinc oxide, the presence of which promotes the cross-linking function of the phenolic resin; however, with rubbers which do not readily cure with phenolic resins, the conjoint use of a halogen donor and zinc oxide is recommended. The preparation of halogenated phenol resins and their use in a curative system with zinc oxide are described in U.S. Pat. Nos. 2,972,600 and 3,093,613, the disclosures of which are incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term "activator" as used herein means any material which materially increases the cross-linking efficiency of the phenolic curing resin and includes metal oxides and halogen donors either used alone or conjointly. For further details of phenolic curative systems see "Vulcanization and Vulcanizing Agents," W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from SI Group (Schenectady, N.Y.). Similar functionally equivalent phenolic curing resins may be obtained from other suppliers.

Suitable peroxides as a curing agents include, but are not limited to, aromatic diacyl peroxides; aliphatic diacyl peroxides; dibasic acid peroxides; ketone peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxode; tert-butylperbenzoate; tert-butylcumylperoxide; 2,5-bis(t-butylperoxy)-2,5-dimethylhexane; 2,5-bis(t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethylcyclohexane; lauroyl peroxide; succinic acid peroxide; cyclohexanone peroxide; t-butyl peracetate; butyl hydroperoxide, mixtures thereof and combinations thereof.

Sulfur curing agents include, for example, sulfur, sulfur containing compounds, such as substituted guanidineds, substituted xanthates, substituted dithiocarbamates, thiazoles, imidazoles, sulfenamides, thiuramidisulfides, mixtures thereof and combinations thereof.

Silicon-containing curing agents generally include silicon hydride compounds having at least two SiH groups. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, mixtures thereof and combinations thereof.

Suitable azide curing agents include, but are not limited to, azidoformates, such as tetramethylenebis(azidoformate), aromatic polyazides, such as 4,4'-diphenylmethane diazide; and sulfonazides, such as p,p'-oxybis(benzene sulfonyl azide). Additional azide curing agents are disclosed in U.S. Pat. Nos. 3,284,421; and 3,297,674, the disclosures of which are incorporated herein by reference.

A preferred class of azides is the poly(sulfonyl azide) described above.

Additional Optional Components

In some embodiments, the inventive thermoplastic vulcanizate composition further comprises a fifth component comprising a component selected from those additives conventional in the compounding of EPDM rubber, thermoplastic polymer resin and blends thereof. The properties of a TPV may be modified, either before or after vulcanization, by addition of ingredients which are conventional in the compounding of EPDM rubber, thermoplastic polymer resin and blends thereof. Examples of such optional fifth components include particulate filler such as carbon black, amorphous precipitated or fumed silica, titanium dioxide, colored pigments, clay, talc, calcium carbonate, wollastonite, mica, montmorillonite, glass beads, hollow glass spheres, glass fibers, zinc oxide and stearic acid, stabilizers, antidegradants, flame retardants, processing aids, adhesives, tackifiers, plasticizers, wax, discontinuous fibers, such as wood cellulose fibers.

Colorable compositions may be prepared by incorporation of non-black fillers instead of carbon black. Colorless, off-white or white pigments (fillers, extenders, or reinforcing pigments) such as amorphous precipitated or fumed silica, aluminum silicate, magnesium silicate, kaolin clay, montmorillonite, wollastonite, and titanium dioxide are suitable for such purposes.

Some embodiments of the inventive thermoplastic vulcanizate composition further comprise an extender oil. Any one or combination of known extender oils, including for example, naphthenic, aromatic or paraffinic oils, may optionally be used in the inventive composition. Additional useful extender oils are disclosed in Rubber World Blue Book, 1975 Edition, Materials and Compounding Ingredients for Rubber, pages 145-190. The quantity of extender oil added depends upon the properties desired, with the upper limit depending upon the compatibility of the particular oil and blend ingredients which limit is exceeded when excessive exuding of extender oil occurs. Typically, from about 5 to about 300 parts by weight extender oil are added per 100 parts by weight blend of olefin rubber and thermoplastic polymer resin. Commonly, from about 30 to about 250 parts by weight of extender oil are added per 100 parts by weight of rubber present in the blend with quantities of from about 70 to about 200 parts by weight of extender oil per 100 parts by weight of rubber being preferred. The amount of extender oil depends, at least in part, upon the type of rubber. High viscosity rubbers are more highly oil extendable.

The inventive thermoplastic vulcanizate composition has a tensile strength at break of greater than or equal to 8 MPa. All individual values and sub-ranges from greater than or equal to 8 MPa are included herein and disclosed herein; for example, the tensile strength at break of the inventive composition can be from greater than or equal to 8, 9, or 10 MPa.

In some embodiments, the inventive thermoplastic vulcanizate composition has a tensile strength at break of less than or equal to 50 MPa. All individual values and sub-ranges less than or equal to 50 MPa are included herein and disclosed herein; for example, the tensile strength at break of the inventive composition can be from less than or equal to 10, 20, 30, 40 or 50 MPa.

The inventive thermoplastic vulcanizate composition has a tear strength at 23° C. of greater than or equal to 190 lb-f/in. All individual values and sub-ranges from greater than or equal to 190 lb-f/in. are included herein and disclosed herein; for example, the tear strength of the inventive composition can be from greater than or equal to 190, 200, 210 or 220, 260, 280, 500 lb-f/in.

The process for making a thermoplastic vulcanizate composition of the instant invention comprises: (A) selecting a first component comprising a first propylene-based polymer selected from the group consisting of (i) propylene/α-olefin copolymers comprising from 1 to 20 wt % α-olefin and characterized by a g' ratio of less than 1, measured at interpolymer number average molecular weight (Mn), an MFR (2.16 kg @ 230° C.) greater than or equal to 0.01, a density greater than or equal to 0.850 g/cc, and a molecular weight distribution, Mw/Mn, less than 4, and (ii) combinations thereof and; (B) selecting a second component selected from the group consisting of curable or vulcanizable rubbers, having a density from 0.85 to 0.88 g/cc, $I_2$ from 0.0001 to 5 g/10 min, and a Mooney viscosity from 5 to 400, and combinations thereof; wherein at least one of the rubbers is vulcanizable; and mixing the first and second components under dynamic vulcanization conditions to form the thermoplastic vulcanizate composition; wherein the thermoplastic vulcanizate composition has a tensile strength at break of greater than or equal to 8 MPa and tear strength at 23° C. of at least 190 lb-f/in.

The inventive thermoplastic vulcanizate compositions may be prepared by any suitable method for mixing of rubbery polymers including mixing on a rubber mill or in internal mixers such as a Banbury mixer. In the compounding procedure, the conventional compounding ingredients are incorporated, may include one or more types of carbon black, additional extender oil, other fillers such as clay, silica, tackifiers, waxes, bonding resins, zinc oxide, antioxidants, antiozonants, processing aids, and the cure active agents, and pigments. Generally, it is preferred to add the curing agents in a second stage of compounding which may be on a rubber mill or in an internal mixer operated at a temperature, preferably not in excess of about 60° C. The compounds are cured in a conventional manner by heating from 5 to 60 minutes at temperatures of from 150 to 200° C. to form novel elastomeric vulcanizates having useful properties.

Dynamic vulcanization is a process whereby a blend of plastic, rubber and rubber curative is masticated while curing the rubber. The term "dynamic" indicates the mixture is subjected to shear forces during the vulcanization step as contrasted with "static" vulcanization wherein the vulcanizable composition is immobile (in fixed relative space) during the vulcanization step. One advantage of dynamic vulcanization is that elastoplastic (thermoplastic elastomeric) compositions may be obtained when the blend contains the proper proportions of plastic and rubber.

The inventive compositions may be used in a variety of applications requiring high performance (tensile strength, tensile set, tear strength and processability), such as tires, hoses, belts, gaskets, moldings and molded parts. They are also useful for modification of thermoplastic resins, in particular, thermoplastic polymer resins. The compositions can be blended with thermoplastic resins to make rubber modified thermoplastic resin by using conventional mixing equipment. The properties of the modified thermoplastic resin depend upon the amount of thermoplastic elastomer composition blended.

In preferred embodiments, the inventive compositions are used to form 0.452 mil or 0.462 mil calendared sheets, thermoplastic sheets heat welded into membranes, pond liners, and roofing membranes.

Examples

The following examples illustrate the present invention but are not intended to limit the scope of the invention. The weight percent of each of the inventive and comparative examples are based on the total formulation weight, unless stated otherwise.

Two compounding processes were used to prepare the examples discussed below. The first compounding process was a batch process. For the following discussion, component A is a propylene/ethylene copolymer with long chain branching, having an MFR of 2; component B is an EPDM polymer, commercially available as NORDEL IP 4770, available from The Dow Chemical Company; component C is a comparative propylene-based polymer, specifically, a propylene homopolymer and/or propylene/olefin copolymer (as specified in the following Tables) which does not exhibit; component D is a curing agent, selected from a phenolic resin, available from the SI Group under the name SP-1045, ZnO and $SnCl_2$ from Sinopharm Chemical Reagent Co., Ltd. (Shanghai, China); and component F is a paraffinic oil.

The compounding process using an internal mixer was as follows: (1) Components A, B, C and F were charged into a Brabender mixer and mixed for about 2 minutes at 190° C. to form a homogeneous melt; (2) component D was added at approximately 190° C. and the ram was lowered; (3) the oil was added on top of the ram, allowing only a small amount of oil to enter into the chamber each time the ram made an upward movement; (4) After the torque began to increase (at about 195° C. or about three minutes after all of the oil was incorporated), zinc oxide was added with continued mixing for about two minutes; (5) the mixture was removed from the Brabender by reverse jogging; (6) the mixture was cooled and allowed to granulate.

Compression molded samples were formed by compressing the cooled and granulated compositions at about 190° C. for about three minutes, followed by cooling using forced air. Following compression molding, the plaques were conditioned at room temperature (23° C.) for about 24 hours after which samples were cut into 15.2×15.2×.32 cm plaques. The compression molding technique described in ASTM D4703 was used for preparation of the sample plaques (ASTM D4703 also provides a test for test for density but, in this case, that test method was used solely for the plaque preparation).

The compounding process was also performed using an extruder according to the following: Components A, B, C, and F were charged to the extruder; oil was added; the phenolic curing agent (such as SP1055) was fed via a side arm feeder at a point along the extruder barrel such that all other ingredients have been intimately mixed prior to the phenolic curing agent feed. Alternatively, non halogenated phenolic curatives (such as SP1045) may be added in place of the halogen donator with the other ingredients. The halogen donator (such as, stannous chloride) was then added downstream to the extruder via a side feeder. The extruder or mixer should be operated so that the temperature profile within the zones of the extruder preferably does not exceed 220° C. The melt was then cooled and pelletized.

The foregoing demonstrated that the inventive compositions can be used to produce a thermoplastic vulcanizate composition in a one step process either in a batch process (e.g. via Brabender) or via a continuous compounding process (e.g. twin screw).

The compositions of Inventive Examples (Inv. Ex. 1-6) and Comparative Examples (Comp. Ex. A-F) shown in Tables 1-3 below were prepared using the following sample preparation method. The sample preparation was as follows: SANTOPRENE 201-64 and a propylene-based polymer (as described in Tables 1-3) were compounded through a twin screw extruder (Berstorff GmbH 2E25A, L/D=41/1), with speed of 100~200 rpm, at a temperature profile between 170 to 230° C. The extruded samples were formed into compression molded plaques at about 190° C. for about three minutes and cooled by cold press at room temperature (23° C.) for 5 min. The pressed samples were conditioned at room temperature for about 24 hours and then cut into test plaques. SANTOPRENE 201-64, available from Advanced Elastomer System is a curable or vulcanizable rubber comprising an EPDM interpolymer, a thermoplastic homopolypropylene, a filler and an oil. Comparative Example A is SANTOPRENE 201-64 with no first propylene-based polymer.

TABLE 1

|  | Comp. Ex. A (phr) | Inv. Ex. 1 (phr) | Comp. Ex. B (phr) | Inv. Ex. 2 (phr) | Comp. Ex. C (phr) | Inv. Ex. 3 (phr) | Comp. Ex. D (phr) |
| --- | --- | --- | --- | --- | --- | --- | --- |
| SANTOPRENE 201-64 | 100 | 100 | 100 | 100 | 100 | 100 | 100 phr |
| Propylene/ethylene copolymer with g' ratio of less than 1, MFR = 2; density = 0.866 g/cc | — | 10 phr | — | 30 phr | — | 50 | — |
| Propylene/ethylene copolymer g' ratio of equal to 1, MFR = 2; density = 0.866 g/cc | — | — | 10 | — | 30 | — | 50 |
| Hardness (Shore A) | 66 | 66 | 64 | 67 | 65 | 67 | 65 |
| Tensile Strength at break, MPa | 5.9 | 8.5 | 5.7 | 12.9 | 5.3 | 17.0 | 6.7 |
| Elongation at break, % | 392 | 581 | 468 | 726 | 461 | 805 | 558 |
| Tensile Set at room temperature, % | 9.6 | 9.6 | 10.1 | 10.4 | 14.4 | 12.1 | 16.4 |
| Tear Strength @ 23° C., lb-f/in | 143.1 | 194.3 | 153.0 | 236.4 | 160.3 | 254.6 | 185.3 |
| $I_2$ (of total composition) @ 190° C., g/10 min. | 0.05 | 0.18 | 0.09 | 0.69 | 0.46 | 0.79 | 0.65 |
| $I_{10}$ (of total composition) @ 190° C., g/10 min. | 22.4 | 27.1 | 19.7 | 27.9 | 19.5 | 25.0 | 17.2 |

As shown in the Tables 1 and 2, the Inventive Examples which comprise a first propylene-based polymer characterized by a g' ratio of less than 1 have much higher tensile strength and generally improved mechanical properties than the Comparative Examples which comprise a first propylene-based polymer characterized by a g' ratio of greater than 1. For example, Inventive Example 1 has improved tensile strength at break, tear strength and elongation at break over Comparative Example B. As the amount of the propylene-based polymer is increased from 10 phr to 30 phr, the improved performance of Inventive Example 2 over Comparative Example C is seen for each of the tensile strength at break, tear strength and elongation at break properties. Similarly, as the amount of the propylene-based polymer is increased to 50 phr, the improved performance of Inventive Example 3 over Comparative Example D is again seen for each of the tensile strength at break, tear strength and elongation at break properties. Similar improvements in mechanical properties of the Inventive Examples over the Comparative Examples can be seen in Table 2.

TABLE 2

|  | Inv. Ex. 4 | Comp. Ex. E | Inv. Ex. 5 | Comp. Ex. F |
| --- | --- | --- | --- | --- |
| SANTOPRENE 201-64 | 100 | 100 | 100 | 100 |
| Propylene/ethylene copolymer with g' ratio less than 1, MFR = 8; density = 0.876 g/cc | 30 | — | — | — |
| Propylene/ethylene copolymer with g' ratio equal to 1, MFR = 8; and density = 0.876 g/cc | — | 30 | — | — |
| Propylene/ethylene copolymer with g' ratio less than 1, MFR = 8; density = 0.876 g/cc | — | — | 30 | — |
| Propylene/ethylene copolymer with g' ratio equal to 1, MFR = 8; and density = 0.876 g/cc | — | — | — | 30 |
| Hardness | 74 | 74 | 66 | 62 |
| Tensile Strength at break, MPa | 15.2 | 12.8 | 11.5 | 3.6 |
| Elongation at break, % | 703 | 641 | 665 | 318 |
| Tensile Set at 23° C., % | 15 | 16 | 12 | 16 |
| Tear Strength @ 23° C., lb-f/in | 264 | 253 | 212 | 123 |
| $I_2$ (of total composition) @ 190° C. (g/10min) | 1.65 | 1.37 | 1.62 | 1.2 |
| $I_{10}$ (of total composition) @ 190° C. (g/10min) | 71.2 | 47.2 | 54.6 | 47.5 |

TABLE 3

|  | Inv. Ex. 2 | Thermoplastic polyolefin (TPO) | XL-EPDM* | HiFax CA10A** |
| --- | --- | --- | --- | --- |
| Hardness (Shore A) | 67 | 96 | 60 | 89 |
| Tensile Strength at break MPa | 12.9 | — | 11.6 | 12.1 |
| Tensile Strength at yield MPa | — | 9.0 | — | — |
| Elongation at break % | 726 | — | 478 | 606 |
| Elongation at yield MPa | — | 23 | — | — |
| Tensile Set at 23° C. % | 10.4 | 57.3 | — | 32.0 |
| Tear Strength @ 23° C., lb-f/in | 236.4 | 470 | 244 | 440 |
| $I_2$ (of total composition) @ 190° C. g/10min | 0.69 | 0.86 | — | 0.28 |
| $I_{10}$ (of total composition) @ 190° C. g/10min | 27.9 | 10.2 | — | 4.3 |

*Crosslinked ethylene-propylene-diene monomer interpolymer.
**Hifax CA 10 A is a reactor TPO (thermoplastic polyolefin) manufactured using the LyondellBasell's proprietary Catalloy™ process technology, and is available from LyondellBasell, Inc.

TEST METHODS

Test methods utilized in characterizing the components of the Inventive and Comparative Examples include the tests described below. The samples used for testing tensile strength, elongation at break, and tensile set were compression molded at 190° C. and 10 MPa. The molten materials were then quenched in a press equilibrated at room temperature.

GPC Method

For Gel Permeation Chromatography (GPC) measurements, the chromatographic system used is a Polymer Laboratories Model PL-210. The column and carousel compartments were operated at 145° C. Four Polymer Laboratories 20-um Mixed-A LS columns were used, with a solvent of 1,2,4 Trichlorobenzene (TCB). The samples were prepared at a concentration of 0.1 g of polymer in 50 ml of solvent. The solvent contained 200 ppm of the antioxidant butylated hydroxytoluene (BHT). Samples were prepared by agitating lightly for 1-2 hours at 160° C. The injection volume was 200 microliters and the flow rate was 1.0 ml/min. Calibration of the GPC column set was performed with narrow molecular weight distribution polystyrene standards purchased from Varian Inc. (previously Polymer Laboratories). The polystyrene standard peak molecular weights were converted to polyethylene molecular weights using Williams, T., and I. M. Ward, "The Construction of Polyethylene Calibration Curve for Gel Permeation Chromatography Using Polystyrene Fractions", J. Polym. Sci. Polym. Lett., 6, 631 (1968): $M_{polyethylene}=0.431(M_{polystyrene})$.

Polyethylene equivalent molecular weight calculations are performed using Viscotek TriSEC software Version 3.0.

Melt Indices and Melt Flow Rate

Melt index ($I_2$) of an ethylene-based polymer is measured in accordance with ASTM D-1238-04, condition 190° C./2.16 kg. Melt index ($I_5$) of an ethylene-based polymer is measured in accordance with ASTM D-1238-04, condition 190° C./5.0 kg. Melt index ($I_{10}$) of an ethylene-based polymer is measured in accordance with ASTM D-1238-04, condition 190° C./10.0 kg. High load melt index ($I_{21}$) of an ethylene-based polymer is measured in accordance with ASTM D-1238-04, condition 190° C./21.0 kg. For propylene-based polymers, the melt flow rate (MFR) is measured in accordance with ASTM D-1238-04, condition 230° C./2.16 kg.

Shore A Hardness

Shore A hardness was measured per ASTM D2240 on injection molded plaques of 0.32 cm thickness. This test method permits hardness measurements based on either initial indentation or indentation after a specified period of time, or both. As used herein, the indentation was measured at a specified time of 10 seconds.

Tensile and Elongation Properties

Tensile strength and elongation at break was measured using ASTM D 1708 which is a micro-tensile method with a pull rate of 5 inches/minute in the flow direction of the injection molded plaque. The dimensions of the injection molded plaque were 101.6 mm×152.4×3.2 mm.

Mooney Viscosity

Polymer Mooney viscosity (ML 1+4 at 125° C.) was measured in accordance with ASTM 1646-04, with a one minute preheat time and a four minute rotor operation time. The instrument is an Alpha Technologies Rheometer MDR.

Tear Strength

Tear strength was measured according to ASTM D624 Die C.

Density—

Density was measured according to ASTM D-792.

Melting Point

Melting point was measured according to ASTM D-3418

The present invention may be embodied in other forms without departing from the spirit and the essential attributes thereof, and, accordingly, reference should be made to the appended claims, rather than to the foregoing specification, as indicating the scope of the invention.

We claim:

1. A thermoplastic vulcanizate composition consisting of:
   from 5 wt % to 95 wt %, based on the total weight of the thermoplastic vulcanizate composition, of a propylene/α-olefin copolymer comprising from 1 to 20 percent by weight of units derived from α-olefin and characterized by a g' ratio of less than 1, measured at interpolymer number average molecular weight (Mn), an MFR (2.16 kg @ 230° C.) greater than or equal to 0.01, a density greater than or equal to 0.850 g/cc, and a molecular weight distribution, Mw/Mn, less than or equal to 3.5;
   from 5 wt % to 95 wt %, based on the total weight of the thermoplastic vulcanizate composition, of an ethylene-propylene-diene-rubber having a density from 0.85 to 0.88 g/cc, $I_2$ from 0.001 to 5 g/10 min, and a Mooney viscosity from 5 to 400, and combinations thereof; and
   optionally, one or more additives selected from the group consisting of, colored pigments, stabilizers, anti-degradants, flame retardants, processing aids, adhesives, tackifiers, plasticizers, waxes, and discontinuous fibers
   wherein the thermoplastic vulcanizate composition has a tensile strength at break of greater than or equal to 8 MPa and tear strength at 23° C. of at least 190 lb-f/in.

2. The thermoplastic vulcanizate composition according to claim 1, further comprising one or more fillers.

3. A process for making a thermoplastic vulcanizate composition consisting of first and second components, the process comprising:
   selecting a first component consisting of propylene/α-olefin copolymer comprising from 1 to 20 percent by weight of units derived from α-olefin and characterized by a g' ratio of less than 1, measured at interpolymer number average molecular weight (Mn), an MFR (2.16 kg @ 230° C.) greater than or equal to 0.01, a density greater than or equal to 0.850 g/cc, and a molecular weight distribution, Mw/Mn, less than or equal to 3.5;
   selecting a second component consisting of an ethylene-propylene-diene-rubber having a density from 0.85 to 0.88 g/cc, $I_2$ from 0.001 to 5 g/10 min, and a Mooney viscosity from 5 to 400; and
   mixing the first and second components under dynamic vulcanization conditions to form the thermoplastic vulcanizate composition;
   wherein the thermoplastic vulcanizate composition has a tensile strength at break of greater than or equal to 8 MPa and tear strength at 23° C. of at least 190 lb-f/in.

4. An article comprised of one or more thermoplastic vulcanizate compositions of claim 1.

5. The thermoplastic vulcanizate composition according to claim 1 wherein the propylene/α-olefin copolymer has a g' ratio of less than 0.85, measured at interpolymer number average molecular weight (Mn).

6. The thermoplastic vulcanizate composition according to claim 1 wherein the propylene/α-olefin copolymer has a g' ratio of less than 0.80, measured at interpolymer number average molecular weight (Mn).

7. The thermoplastic vulcanizate composition according to claim 1 wherein the propylene/α-olefin copolymer comprises at least 80 weight percent (wt %) units derived from propylene, and between 1 and 20 wt % units derived from ethylene.

8. The thermoplastic vulcanizate composition according to claim 1 wherein the propylene/α-olefin copolymer is characterized by a relative compositional drift of less than 50%.

9. The thermoplastic vulcanizate composition according to claim 1 wherein the propylene/α-olefin copolymer is characterized by a relative compositional drift of less than 40%.

10. The thermoplastic vulcanizate composition according to claim 1 wherein the propylene/α-olefin copolymer is characterized by a propylene chain segments having a chain isotacticity triad index of at least 70 mole percent.

11. The thermoplastic vulcanizate composition according to claim 1 wherein the propylene/α-olefin copolymer is characterized by a propylene chain segments having a chain isotacticity triad index of at least 80 mole percent.

12. A thermoplastic vulcanizate composition consisting of:
    from 5 wt % to 95 wt %, based on the total weight of the thermoplastic vulcanizate composition, of a propylene/ethylene copolymer comprising from 1 to 20 percent by weight of units derived from ethylene and characterized by a g' ratio of less than 1, measured at interpolymer number average molecular weight (Mn), an MFR (2.16 kg @ 230° C.) greater than or equal to 0.01, a density greater than or equal to 0.850 g/cc, and a molecular weight distribution, Mw/Mn, less than or equal to 3.5;

from 5 wt % to 95 wt %, based on the total weight of the thermoplastic vulcanizate composition, of an ethylene-propylene-diene-rubber having a density from 0.85 to 0.88 g/cc, $I_2$ from 0.001 to 5 g/10 min, and a Mooney viscosity from 5 to 400, and combinations thereof; and optionally, one or more additives selected from the group consisting of, colored pigments, stabilizers, anti-degradants, flame retardants, processing aids, adhesives, tackifiers, plasticizers, waxes, and discontinuous fibers;

wherein the thermoplastic vulcanizate composition has a tensile strength at break of greater than or equal to 8 MPa and tear strength at 23° C. of at least 190 lb-f/in.

* * * * *